E. MEIS.
VEHICLE.
APPLICATION FILED MAR. 29, 1916.
1,227,477.
Patented May 22, 1917.
2 SHEETS—SHEET 1.
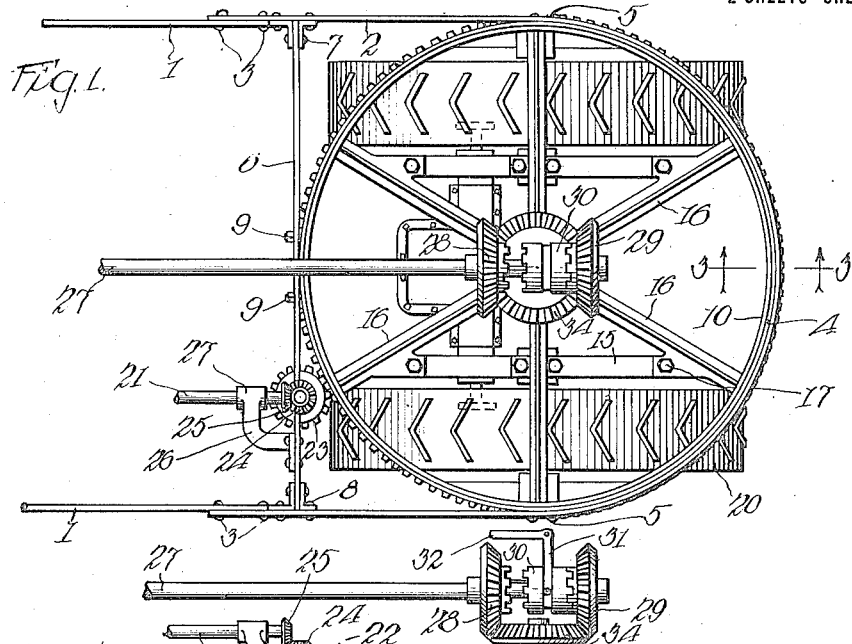
Fig. 1.
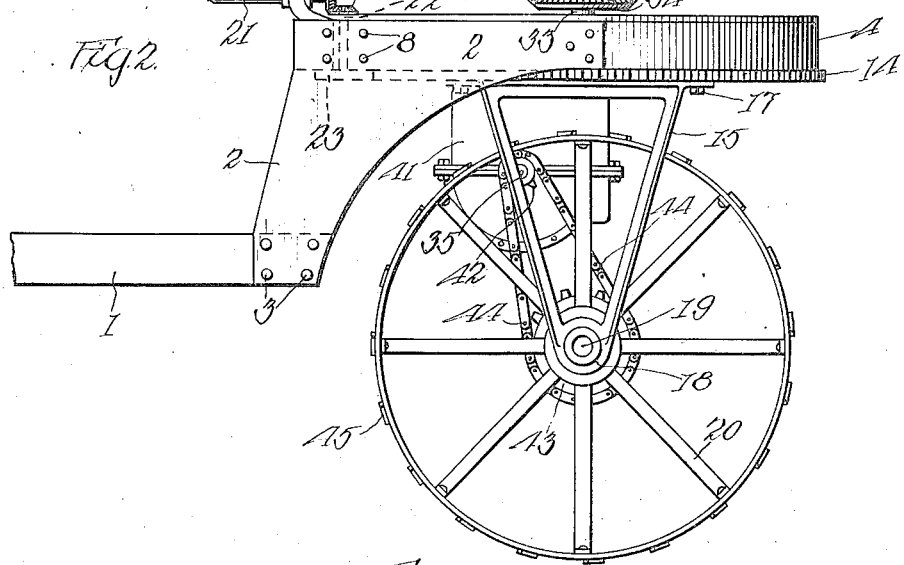
Fig. 2.
Fig. 3.
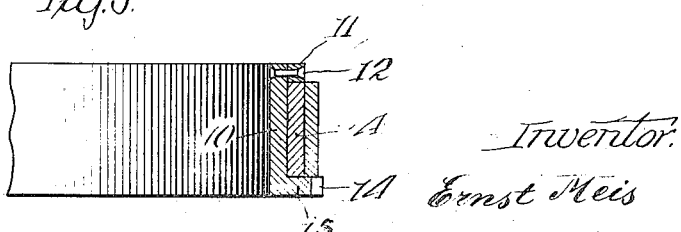
Witness.
Leo J. Dumais.
Inventor.
Ernst Meis
by Robt. Kloff
Atty.

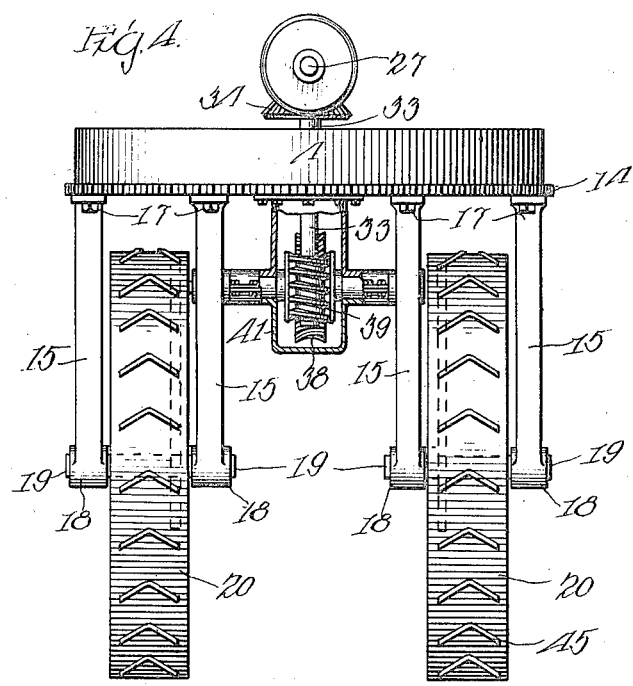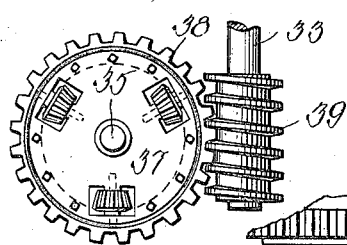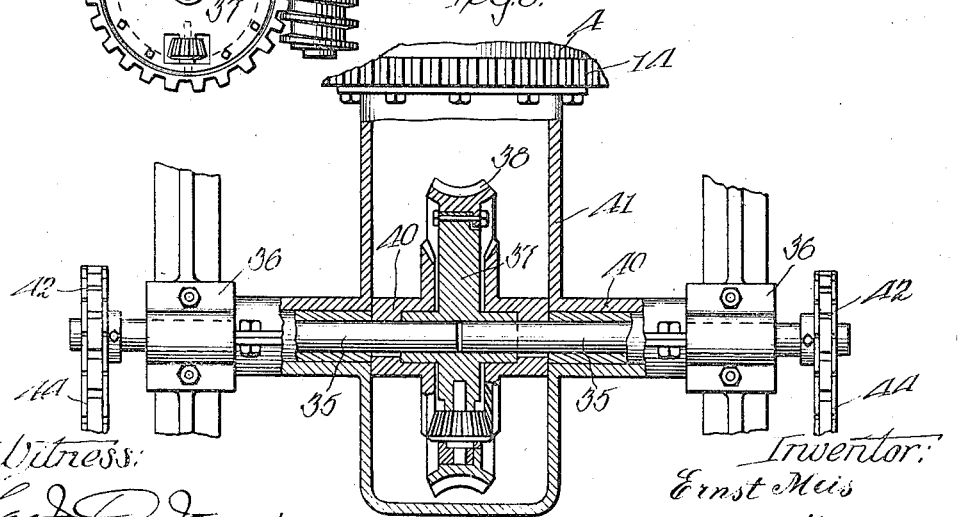

UNITED STATES PATENT OFFICE.

ERNST MEIS, OF PERU, ILLINOIS.

VEHICLE.

1,227,477.  Specification of Letters Patent.  Patented May 22, 1917.

Application filed March 29, 1916. Serial No. 87,396.

*To all whom it may concern:*

Be it known that I, ERNST MEIS, a subject of the Emperor of Germany, residing at Peru, in the county of La Salle and State of Illinois, have invented certain new and useful Improvements in Vehicles, of which the following is a specification.

My invention relates to improvements in vehicles and more particularly to motor driven vehicles such as farm tractors or the like.

In my improvement the supporting axle and its wheels are revolubly mounted in the vehicle frame so that they may be turned on a vertical axis for steering purposes and the power transmission mechanism is arranged to supply power to drive the wheels at any point of their steering adjustment.

To this end the axle and wheels are journaled in depending portions of a steering frame which carries a horizontal wheel at its upper extremity which is rotatably mounted in a stationary ring or annulus forming a portion of the main frame of the vehicle and a driven shaft which is carried by the steering frame, is centered in said rotatable horizontal wheel and operatively connected at its respective ends to a shaft extending from a source of power and means for transmitting power to the driven wheels of the vehicle, so that power will be transmitted equally at any point of adjustment of the steering frame.

The objects of my invention are to produce an extremely strong and durable vehicle which is easily steered and driven, in which the parts are accessible for adjustment, repair, replacement or cleaning and of a simple and cheap construction readily understood by the average mechanic.

These and other objects I accomplish as hereinafter set forth in the following description and as particularly pointed out in the appended claims reference being had to the accompanying drawings in which an embodiment of my invention is illustrated.

In the drawings:

Fig. 1, represents a top plan view of a fragment of one end of a vehicle embodying my improvements.

Fig. 2, is a side elevation of the vehicle fragment shown in Fig. 1.

Fig. 3, is an enlarged transverse vertical section through the horizontal wheel of the steering frame and its supporting ring on line 3—3, Fig. 1.

Fig. 4, is an end view partially in section of the improved vehicle.

Fig. 5, is a fragmentary view of the differential and its worm drive.

Fig. 6, is an enlarged fragmentary vertical section through the steering frame and the power transmitting mechanism carried thereby.

In referring to the drawings in detail like numerals designate corresponding parts.

My improvements may be incorporated in various types of vehicles such as tractors for farms and other purposes, fire apparatus, trucks, etc., and the steering improvement may be utilized alone in vehicles other than motor driven, horse drawn vehicles for instance.

In the embodiment or adaptation of my invention shown in the accompanying drawings my improvements are shown located at one end of a tractor in which 1, designates the side members of the frame, fragments of which are shown in Figs. 1 and 2.

Two angular members 2, are each rigidly fastened at its lower and inner extremity, by bolts, rivets or other means 3, to the end of one of the side members 1, and curve or bend upward and outward as shown in Fig. 2.

Between the upper portion of these angular members 2, and in a plane parallel to and above the horizontal plane of the side members 1, I place a stationary ring or annulus 4 which is rigidly fastened on opposite sides to the outer extremities of the angular members 2 by rivets, bolts or the like 5.

To brace and stiffen the angular members 2, a transverse connecting bar 6, is extended between the said angular members at points inwardly from the ring 4, being fastened to the members 2, at its ends by angle plates 7, and bolts, rivets or the like 8.

The bar has its middle portion in contact with the ring 4, midway between the points at which said ring is secured to the members 2, and said middle portion may be bolted or otherwise suitably fastened to the ring to add stiffness, strength and rigidity to the construction by bolts or other fastening means 9.

The supporting wheels of the vehicle are arranged conventionally in transverse pairs and a steering frame carrying a pair of wheels and their supporting axle or axles is rotatably mounted in the stationary ring 4, of the vehicle frame.

As shown the steering frame has a top horizontal wheel 10, which is rotatably mounted in concentric position within the ring 4, being held therein by a band 11, which surrounds the wheel 10, and fits and slides upon the top edge of the ring 4, as shown in Fig. 3.

The band is detachably fastened to the wheel rim by bolts or screws 12.

The lower end of the wheel rim is provided with an outwardly extending annular flange 13, which projects beneath the ring 4, and has its outer circular edge toothed as shown at 14 in Fig. 3.

A series of V-shaped supporting hangers 15, depend from the spokes 16, of the wheel 10, being secured thereto at their upper ends by bolts or the like 17.

These hangers are arranged in horizontal alinement and in side pairs and carry bearings 18 at their lower apices in which the short shafts 19, on which the supporting wheels 20 are mounted, are journaled.

The wheel 10 is rotated in the ring 4, from a steering column 21, which connects to a suitable manually operated hand wheel (not shown) through a short vertical shaft 22, journaled in bearings attached to the bar 6, which carries a gear wheel 23, at its lower end meshing with the teeth 14 of the flange 13 of the wheel and a bevel gear wheel 24 at its upper extremity meshing with a similar bevel gear wheel 25, on the steering column 21.

The steering column is suported from the bar 6, by an angular brace 26, as shown in Fig. 1, the brace carrying a bearing 27 at its inner extremity through which the column passes.

As shown in Fig. 4, the wheels are mounted on two separate short axles, so that a space is provided between them to permit the tractor to traverse cultivated ground with partially grown crops without injuring the same, the rows of which pass between the wheels as the machine travels.

I have also in connection with my improved steering mechanism provided means for transmitting power to the axles and wheels which is operable at all points of steering adjustment.

This is due to the fact that one of the driven shafts transmitting the power is centralized with respect to the wheel 10.

I have not considered it necessary to illustrate a power plant such as an internal combustion motor in my drawings, but 27 represents a horizontal shaft connected to a source of power which carries a pair of opposed bevel gear wheels 28 and 29, at its outer end.

These gear wheels 28 and 29 are loose on the shaft so as to rotate independently thereon but are not slidable longitudinally on said shaft and between the gear wheels I arrange a clutch sleeve 30, which is slidable on said shaft but held against independent rotation in any well known way.

The clutch sleeve 30 is shifted to lock either of the gear wheels to the shaft by a lever 31, manually actuated through a connecting rod 32.

A vertical shaft 33, is journaled in suitable bearings at the center of the wheel 10, and carries a bevel gear wheel 34 at its upper end which is in mesh with both of the gear wheels 28 and 29, as shown in Fig. 2.

From this it will be noted that the direction of rotation of the shaft 33, may be reversed or said shaft may be stopped by shifting the clutch sleeve 30.

A short transverse countershaft 35 is mounted in bearings 36, located near the upper ends of the inner branches of the V-shaped hangers 15, see Fig. 6.

This shaft 35 is preferably in two half portions connected by a differential mechanism 37, as shown in Fig. 5 which carries an outer worm wheel 38 that meshes with a worm 39 on the lower end of the shaft 33.

The shaft 35 and differential 37 are incased in a tubular casing 40, and the vertical shaft 33, the middle portion of the shaft 35 and its casing and the differential are also inclosed in a comparatively large depending housing 41.

The two part countershaft 35 is provided with sprockets 42, at its outer ends and the wheels 20 also carrying sprockets 43, and these sprockets are operatively connected by chains 44, to transmit power from the countershaft to the wheels.

The tread surfaces of the wheels 20 are preferably made wide and provided with transverse gripping flanges 45 to prevent slipping or skidding.

While I have illustrated and described a preferred form of construction for carrying my invention into effect, the same is capable of a wide range of variation, alterations, modification and change without departing from the spirit of my invention, I therefore do not wish to be limited to the construction herein shown and described, but desire to avail myself of all such variations, alterations, modifications and changes as fairly fall within the scope of the appended claims, or may be construed to be within the same by involving the doctrine of equivalents.

What I claim as my invention and desire to secure by Letters Patent is:—

1. In a vehicle, a frame having a stationary annulus, and steering unit, having a top wheel journaled in the annulus, hangers depending from the top wheel and arranged in spaced pairs and a supporting wheel supported between the hangers of each pair.

2. In a vehicle, a frame having a stationary horizontal annulus at one end thereof, a steering wheel mounted in said annulus and adapted to turn therein, hangers depending from said wheel and arranged in alinement and in spaced pairs, a short shaft extending between the hangers of each pair and a supporting wheel mounted on said shaft.

3. In a vehicle, a frame having a stationary horizontal annulus at one end thereof, a steering wheel mounted in said annulus and adapted to turn therein; said wheel having a lower outwardly extending toothed flange, means coöperating with said toothed flange to turn the wheel, hangers depending from said wheel and arranged in alinement and in pairs spaced from the axis of said steering wheel, a short shaft extending between the hangers of each pair and a supporting wheel mounted on said shaft.

4. In a vehicle, a frame having a stationary annulus, and a steering unit comprising supporting wheels, hangers and a top wheel mounted in the stationary annulus so as to turn therein, and power transmitting mechanism including a vertical shaft centralized with the top wheel and mechanism operatively connecting said vertical shaft to the supporting wheels, said supporting wheels being on opposite sides of and remote from the axis of said top wheel.

5. In a vehicle, a frame having a stationary annulus, and a steering unit comprising supporting wheels, hangers and a top wheel mounted in the stationary annulus so as to turn therein, and power transmitting mechanism including a vertical shaft mounted in bearings centered with respect to the top wheel and connected to a source of power, and mechanism between said supporting wheels operatively connecting said vertical shaft to the supporting wheels, said supporting wheels being on opposite sides of and remote from the axis of said top wheel.

6. In a vehicle, a frame having a stationary annulus, and a steering unit comprising spaced supporting wheels, hangers and a top wheel mounted in the stationary annulus so as to turn therein, and power transmitting mechanism including a vertical shaft mounted in bearings centered with respect to the top wheel and connected to a source of power, a countershaft geared to the vertical shaft, and means connecting the countershaft to the supporting wheels, said supporting wheels, hangers and mechanism being arranged below the top wheel to form an open arch higher than the radius of the supporting wheels.

7. In a vehicle, a frame having a stationary annulus, and a steering unit comprising supporting wheels, hangers and a top wheel mounted in the stationary annulus so as to turn therein, and power transmitting mechanism including a vertical shaft mounted in bearings centered with respect to the top wheel and connected to a source of power, a countershaft geared to the vertical shaft, and sprockets and chains connecting the countershaft to the supporting wheels, said supporting wheels, hangers and mechanism being arranged below the top wheel to form an open arch higher than the radius of the supporting wheels.

8. In a vehicle, a frame having a stationary annulus, and a steering unit comprising supporting wheels, hangers and a top wheel mounted in the stationary annulus so as to turn therein, and power transmitting mechanism including a vertical shaft mounted in bearings centered with respect to the top wheel and connected to a source of power, a two part countershaft, differential gearing connecting the countershaft to the vertical shaft, and means connecting the countershaft to the supporting wheels, said supporting wheels, hangers and mechanism being arranged below the top wheel to form an open arch higher than the radius of the supporting wheels.

9. In a vehicle, a frame having a stationary annulus, and a steering unit comprising supporting wheels, hangers and a top wheel mounted in the stationary annulus so as to turn therein, and power transmitting mechanism including a vertical shaft mounted in bearings centered with respect to the top wheel and connected to a source of power, a two part countershaft, differential bearing connecting the countershaft to the vertical shaft, and sprockets and chains connecting the countershaft to the supporting wheels, said supporting wheels, hangers and mechanism being arranged below the top wheel to form an open arch higher than the radius of the supporting wheels.

10. In a vehicle the combination with a frame of a wheel journaled therein for rotation about a vertical axis, a pair of alined horizontal axles spaced from each other on opposite sides of said vertical axis and carried by said wheel below the same, supporting wheels journaled on said axles and power transmitting mechanism positioned between said wheels and connected to each to drive them; said mechanism being entirely above and remote from the space between said axles.

In testimony whereof I have affixed my signature.

ERNST MEIS.